United States Patent
Will et al.

(10) Patent No.: US 7,532,729 B2
(45) Date of Patent: May 12, 2009

(54) METHOD FOR TESTING AN APPLIANCE COMPRISING AN AUDIO PORT, AND A RESPECTIVE APPLIANCE

(75) Inventors: Patrick Will, Rennes (FR); Olivier Horr, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 1168 days.

(21) Appl. No.: 10/759,975

(22) Filed: Jan. 16, 2004

(65) Prior Publication Data
US 2004/0148118 A1      Jul. 29, 2004

(51) Int. Cl.
*H04B 3/00* (2006.01)

(52) U.S. Cl. ............................. 381/80; 700/94; 725/151; 725/139; 381/77; 381/81; 381/55

(58) Field of Classification Search ................. 725/151, 725/139; 702/15, 122; 700/94; 381/58, 381/60, 314, 55, 77, 80, 81, 85, 23, 28
See application file for complete search history.

(56) References Cited

U.S. PATENT DOCUMENTS

| | | | | |
|---|---|---|---|---|
| 4,427,847 A | * | 1/1984 | Hofmann et al. | 348/552 |
| 4,710,917 A | * | 12/1987 | Tompkins et al. | 709/204 |
| 5,644,505 A | * | 7/1997 | Soutar et al. | 381/58 |
| 6,931,120 B1 | * | 8/2005 | Leshner et al. | 379/390.04 |
| 2002/0030871 A1 | * | 3/2002 | Anderson et al. | 359/150 |

OTHER PUBLICATIONS

Patent Abstracts of Japan, vol. 2002, No. 03, Apr. 3, 2002 & JP 2001-320741.
Patent Abstracts of Japan, vol. 2000, No. 13, Feb. 5, 2001 & JP 2000-295499.
Search Report for EPO Patent Appln. No. 03290132 dated Jun. 17, 2003.

* cited by examiner

*Primary Examiner*—Vivian Chin
*Assistant Examiner*—Disler Paul
(74) *Attorney, Agent, or Firm*—Robert D. Shedd; Joseph J. Opalach; Reitseng Lin

(57) ABSTRACT

The appliance comprises an audio port, which is usable as an interface for testing of the appliance. In a preferred embodiment, the appliance comprises stereo output ports, one port for a reception of digital test signals from a control computer and the other port for a transmission of digital signals from the appliance to the control computer. For the separation of the test signals and the audio signals a test adapter is used which is coupled between the appliance, the control computer and an amplifier for the audio signals. The test signals are modulated onto a carrier signal having a frequency of above 20 kHz, for example a frequency within the frequency range of 1-10 MHz. This allows a serial connection, which is compatible with the widely used RS232 link for set-top boxes.

11 Claims, 3 Drawing Sheets

METHOD FOR TESTING AN APPLIANCE COMPRISING AN AUDIO PORT, AND A RESPECTIVE APPLIANCE

FIELD OF THE INVENTION

The invention relates to an appliance comprising an audio port and a method for testing of the appliance. It relates in particular to a set-top box or a digital satellite receiver with two audio ports for a stereo output signal.

BACKGROUND OF THE INVENTION

Set-top boxes and digital satellite receivers are widely used for reception of digital television cable programs or satellite programs and operate usually with a smart card to allow also a decoding of scrambled pay television channels. Smart cards, also known as IC cards, are portable information media, having the size of about a credit card. In this description, the expression set-top box will be used for describing an appliance for receiving digital and/or analogue television programs via cable, satellite, or via terrestrial reception.

Set-top boxes are complex digital appliances, which need extensive testing during production and also occasionally servicing after sales due to its highly integrated digital architecture. It is known to provide a digital set-top box with a so-called FFT interface for allowing factory functional tests (FFT). This is a tool, which gives the capability to drive the set-top box hardware through its low level drivers by using an external computer, for example a PC. The computer is coupled via a standard RS232 serial connection to the set-top box, which comprises a respective port for example on the rear panel. This tool allows easy access during the factory process, especially for the consumer test after production of the appliance, when the box is closed. It is also very useful for after sales diagnostics or development tests too.

The size of the set-top boxes is shrinking more and more as the level of integration in the integrated circuits increases. But especially so-called SCART connectors, being used widely in Europe, consume a considerable amount on the rear panel, and the smaller the set-top boxes are, the fewer places are available for connectors. For the basic operations of a set-top box at least video and audio connectors have to be provided, with an audio reproduction usually in stereo, and respective connectors have to be provided on the rear panel of the set-top box, either in the form of individual connectors, in a unique connector having several pins each one dedicated to a specific signal, or in a combination of individual and mixed connectors.

In the earlier European application 022918329.0 a method for testing of an appliance is disclosed, which uses a test adapter being introduced into a smart card reader of the appliance for testing of the appliance. This allows to avoid the RS232 interface, but it is not possible to test the normal operation of the appliance with a smart card, when using this test procedure. For the testing of all functions of a set-top box, the computer link must not be exclusive with any other standard function being provided by the set-top box.

SUMMARY OF THE INVENTION

According to the invention, an existing audio port of the appliance is used as an interface for testing of the appliance. In particular, the ports of the stereo output of the appliance are used. In a preferred embodiment one port of the stereo output is used for a reception of digital signals from a control computer and the other port is used for a transmission of digital signals from the appliance to the control computer. This allows a serial connection, which is compatible with the widely used RS232 link for set-top boxes.

The separation of the test signals and the audio signals is performed via a test adapter being coupled between the appliance, the control computer and an amplifier for the audio signals. Utilizing high pass and low pass filters, the audio signals and the test signals can be easily separated in the test adapter and the appliance, allowing therefore the complete functionality of the appliance, when testing the appliance. Advantageously an already existing quartz oscillator of the appliance is used for modulating digital data onto a carrier signal with a frequency of above 20 kHz, for example a frequency within the frequency range of 1-10 MHz.

The invention is particularly useful for testing of set-top boxes, which are often provided with the RS232 standard link, but may be used also for testing of any other digital appliances, for example video recorders and audio systems, which comprise usually also at least one audio port.

BRIEF DESCRIPTION OF THE DRAWINGS

The invention is now explained by way of preferred embodiments and with reference to schematic drawings, which show.

DETAILED DESCRIPTION OF PREFERRED EMBODIMENTS

Figure 1:
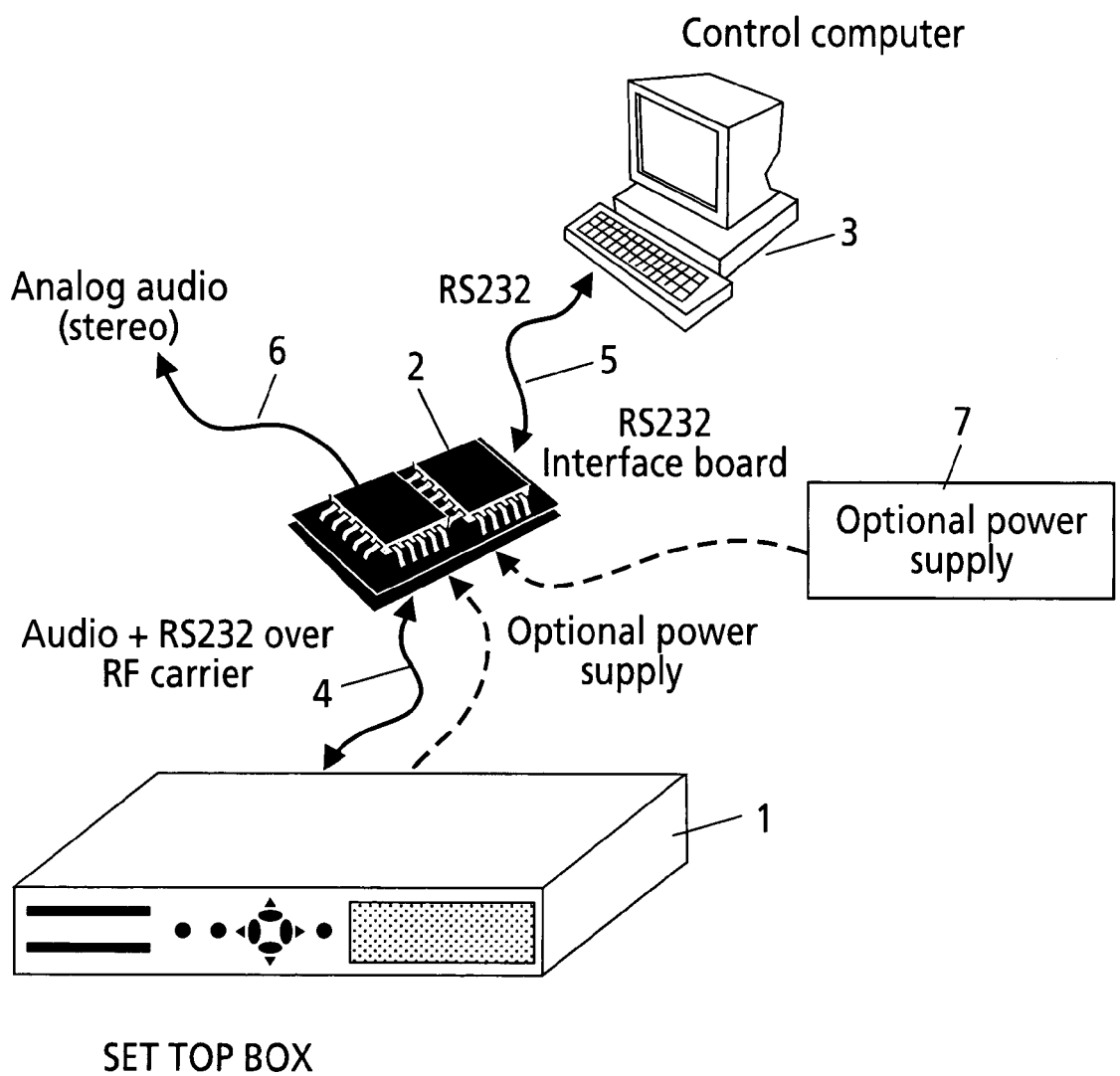
FIG. 1 a test set up for testing of a set-top box.

In FIG. 1 a test setup for a digital set-top box 1 is shown, the test setup comprising a control computer 3 and a test adapter 2 serving as an interface between the set-top box 1 and the control computer 3. The test adapter 2 consists in this embodiment essentially of an interface board, which provides a data transmission between an audio port of the set-top box 1 and the control computer 3. In this embodiment, the connection is performed via an audio cable 4 and an RS232 cable 5 for providing a serial data connection in both directions between the set-top box 1 and the control computer 3.

The test adapter 2 comprises further an analog audio output, which can be coupled via a cable 6 to an audio amplifier (not shown) for a reproduction of audio signals via loudspeakers. The test setup may comprise further a power supply 7 for providing the test adapter 2 with a supply voltage, for example 3.3 V or 5 V. As an alternative, the test adapter 2 may be powered by the set-top box 1, as explained below.

The test adapter 2 can be for example a simple circuit board comprising electrical circuits for the separation of the analog audio signals and digital test signals and comprising respective plugs for the audio cables 4 and 6 and for the RS232 cable 5. The set-top box 1 therefore does not need the up to now widely used RS232 port for the connection to the control computer 3. With a test setup as shown in FIG. 1, the full functionality of the set-top box 1 is provided during all of the test procedures, as before with the RS232 port on the rear panel of the set-top box.

As the audio cables 4 and 6 conventional analog audio cables are used, for example with RCA connectors, via which the audio signals of the set-top box 1 are transmitted in the low frequency range of about 20 Hz to 20 kHz. With the test adapter 2, the digital test signals from the control computer 3 are modulated onto a high frequency signal, for example onto a carrier frequency of about 1-10 MHz, and which is demodulated in the set-top box 1 by a demodulator. The low frequency and the high frequency signals can be easily separated in the test adapter 2 and the set-top box 1, for example with simple low pass and high pass filters. The response of the set-top box 1 to the test signals of the control computer 3 is modulated via an oscillator of the set-top box 1 onto a carrier frequency and transmitted via the audio cable 4 to the test adapter 2, demodulated in the test adapter 2 and subsequently transmitted via cable 5 and test adapter 2 to the control computer 3.

In particular, the set-top box 1 comprises two audio output ports for stereo output signals and the test adapter 2 two respective audio ports for a connection to the set-top box 1. One audio port is used for a transmission of test signals from the control computer 3 via the test adapter 2 to the set-top box 1 and the other audio port is used for a transmission of the response of the set-top box 1 to the control computer 3 via the test adapter 2.

Figure 2:
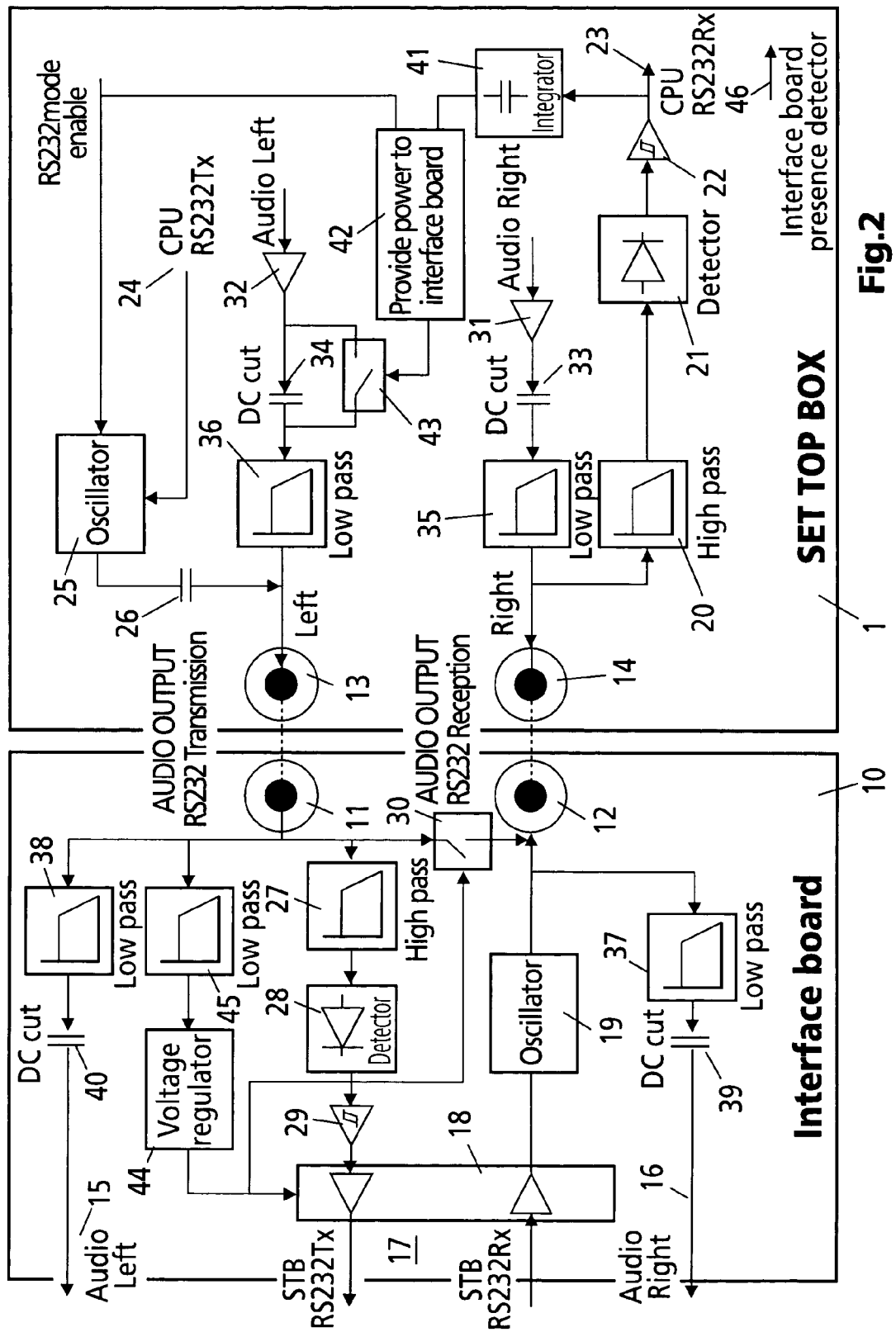
FIG. 2 a block diagram of an interface board and related circuit elements of a set-top box, FIG. 3 digital signals modulated onto a carrier signal, and FIG. 4 a data string of a test sequence for a set-top box.

A schematic block diagram of the respective circuits of the test adapter 2 and the set-top box 1 is shown in FIG. 2. The test adapter 2 comprises an interface board 10, which has two audio ports 11 and 12 for a connection to left and right stereo output ports 13 and 14 of a set-top box 1 to be tested. The interface board 10 comprises further audio ports 15 and 16 for a connection to a respective amplifier and an RS232 port 17 for a serial connection to a respective control computer. Test signals from the control computer are buffered in a buffer stage 18 and then modulated onto a high frequency carrier utilizing an oscillator 19 for a transmission to the set-top box 1 via the audio ports 12 and 14.

The test signals coming from the interface board 10 are coupled via a high pass filter 20 to a detector 21, which separates and extracts the digital test signals from the high frequency carrier, followed by a discriminator and buffer stage 22. Then the test signals are coupled to a central processing unit (CPU) via a serial RS232 receive terminal 23, as known from prior art.

The response signals from the CPU are coupled via a RS232 transmit channel 24 with a high frequency signal of an oscillator 25 for modulating the digital signal onto a high frequency carrier. This signal is then coupled via a high pass filter 26 to the output port 13 of the left audio output channel of the set-top box 1 for a transmission to the audio port 11 of the interface board 10. On the interface board 10 the modulated carrier signal is separated via a high pass filter 27 from the left audio signal and demodulated via a detector 28. The output signal of the detector 28 is then transmitted via a discriminator 29, the buffer stage 18 and the RS232 port 17 to the control computer.

The audio output signals of the left and right stereo channels 31 and 32 of the set-top box 1 are coupled via DC-cut capacitors 33, 34 and low pass filters 35, 36 as DC free low frequency signals in the known audio frequency range of 20-20 kHz to the audio output ports 13 and 14. On the interface board 10, the audio signals are coupled via low pass filters 37, 38 and DC-cut filters 39, 40 to the audio output ports 15 and 16, for a transmission via an audio cable to an audio amplifier.

The carrier frequencies of the oscillators 19 and 25 can be provided by any quartz oscillator having for example an oscillation frequency in the range of 1-10 MHz, and do not need necessarily to have the same frequency. Because of the large frequency separation of the low frequency audio signals and the high frequency carrier signals, very simple low pass and high pass filters 20, 26, 27, 35, 36, 37, 38 can be used, for example simple passive resistor/capacitor (RC) filters.

The power for the active circuits of the interface board 10 can be provided for example by a separate power supply, as explained with regard to FIG. 1. The supply voltage may be provided also by the set-top box 1, as will be explained now with regard to FIG. 2.

When the set-top box 1 is switched on, the oscillator 25 is activated for checking whether an interface board 10 is connected or not. When an interface board 10 is connected, a relay 30 of the interface board 10 or any other switch, which is closed without power, couples the ports 11 and 12 together. Then there exists a closed loop between the ports 13 and 14 of the set-top box, and the detector 21 and the discriminator 22 of the set-top box 1 receive therefore an unmodulated oscillator signal of oscillator 25.

To the discriminator 22 an integrator 41 is coupled, to which a logic circuit 42 is coupled. When a carrier frequency is present at the detector 21, then the integrator 31 provides a signal to the logic circuit 32, which closes a switch 43, for providing a supply voltage to the interface board 10. In this embodiment, the switch 34 by-passes the DC-cut capacitor 34 between the audio output amplifier 32 and the low pass filter 36, for utilizing the DC level of the audio amplifier 30. This DC power can be easily handled by the amplifier 30, because the required power for the interface board 10 is very low.

The interface board 10 comprises a voltage regulator 44, which is then powered via a low pass filter 45 by the DC supply voltage coming from the set-top box 1, and the voltage regulator 44 provides then all the active circuits of the interface board 10 with the respective supply voltage. The voltage regulator 44 opens also the relay 30 for opening the loop between the audio ports 13 and 14. Then the interface board 10 is fully operational and ready for the testing of the set-top box 1.

When there is no interface board coupled to the set-top box 1, when switching on the set-top box, there is no loop between the ports 13 and 14. The set-top box then recognizes, that no interface board is connected and switches off therefore the oscillator 25 for a normal operation of the set-top box 1.

When the set-top box 1 recognizes the connection of the interface board 10 via the closed loop, the set-top box 1 goes into a test mode and waits for digital command signals provided by a control computer being connected to the interface board 10, as explained with regard to FIG. 1. Because the RS232 port 17 of the interface board 10 is complying with the RS232 standard, the interface board 10 is transparent for the control computer and no hardware or software of the control computer has to be changed for the testing of the set-top box 1. Because the modulated carrier signals and the audio signals are separated on the interface board as well as in the set-top box, the set-top box remains fully functional, when using the interface board 10 for the test. Also the stereo output signals of the set-top box 1 can be included in the tests, when coupling an audio amplifier to the audio output ports 15 and 16. The interface board 10 is designed to be complying with the usual set-top box specifications with regard to the audio outputs, which provide for example an output impedance between 300 $\Omega$ and 1 k$\Omega$.

The choice of the carrier frequency of the oscillators 19 and 25 is directly related to the serial link baud rate. A ratio between the bit duration and the carrier period larger than 10 is a good basis for a reliable operation. Also, the carrier frequency should be about 20 to 50 times higher than the maximum audio frequency of the set-top box in order to guaranty an easy and low cost audio and RF carrier frequency separation in the set-top box 1 and on the interface board 10. In the set-top box 1, an already available oscillator 25 with a frequency around 4 to 5 MHz can be used for example for the modulation of the transmit digital signals coming from the CPU of the set-top box 1. The oscillator 19 of the interface board 10, which modulates the digital signals coming from the control computer onto a carrier frequency, may work in the same frequency range.

With these frequencies, a maximum baud rate of about 400 kHz can be easily handled by the interface board 10 and the set-top box 1. A typical baud rate for testing of a digital set-top box via a RS232 connection is usually not above 115.3 kilobaud.

Figure 3:
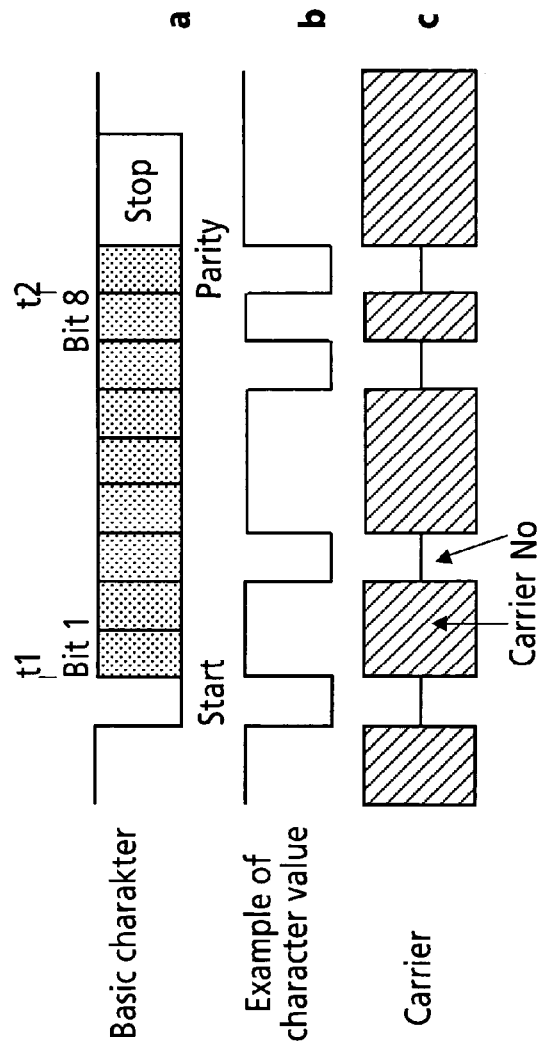

The modulation of the digital signals onto a RF carrier frequency is now explained with regard to FIG. 3. The carrier frequency is on/off modulated by a switch, to which the digital signals are applied. A logical value "0" is represented by RF carrier off, and a logical value "1" is represented by the RF carrier on. The test signals can be transmitted then bit by bit in data words comprising for example each 8 bit of information and a parity bit.

An example of a basic character format of this type is shown in FIG. 3a: If no information has to be transmitted and the transmit channel is in a wait state, the RF carrier signal is present. Then at a time t1 starts an information transmission. The modulated data word comprises a first bit, which is always "0", and then 8 data bits with values "0" or "1", respectively. At a time t2 a parity bit is transmitted providing the parity information for the data bits 1 to 8, and then a "stop" information is provided with carrier frequency on.

All bits have the same defined time length and because the time period of the carrier frequency is about one tens of the duration of one bit, a bit with value "1" comprises therefore about ten oscillation cycles of the carrier frequency. One byte of information having for example the bit sequence "11011101" leads therefore to an envelope signal for the modulator as shown in FIG. 3b. The resulting modulated carrier signal for the character value of FIG. 3b is shown in FIG. 3c.

Defining the level of the carrier frequency in this manner allows the set-top box 1 to constantly monitor the reception of data from the control computer during a time much longer than the transmitted bits and to decide whether the interface board was removed or not. When the carrier frequency is no longer detected via the detector 21, then the carrier frequency provided by the oscillator 25 is switched off and the set-top box returns to a normal mode of operation, in which the RS232 link is disabled.

There are several possibilities to detect the presence of a test adapter by the set-top box 1: One possibility is that the set-top box comprises a test adapter presence detector 46, as indicated in FIG. 2, which is always on for detecting any carrier signal being applied to the audio output 14 and to the detector 21. A further possibility is to use the carrier signal from the oscillator 25, for example after the set-top box 1 is powered on, to observe a loop between the audio ports 13 and 14, and when the loop is closed, to initialize the set-top box 1 for a test modus, in which the set-top box 1 is ready for tests in combination with a control computer.

Figure 4:
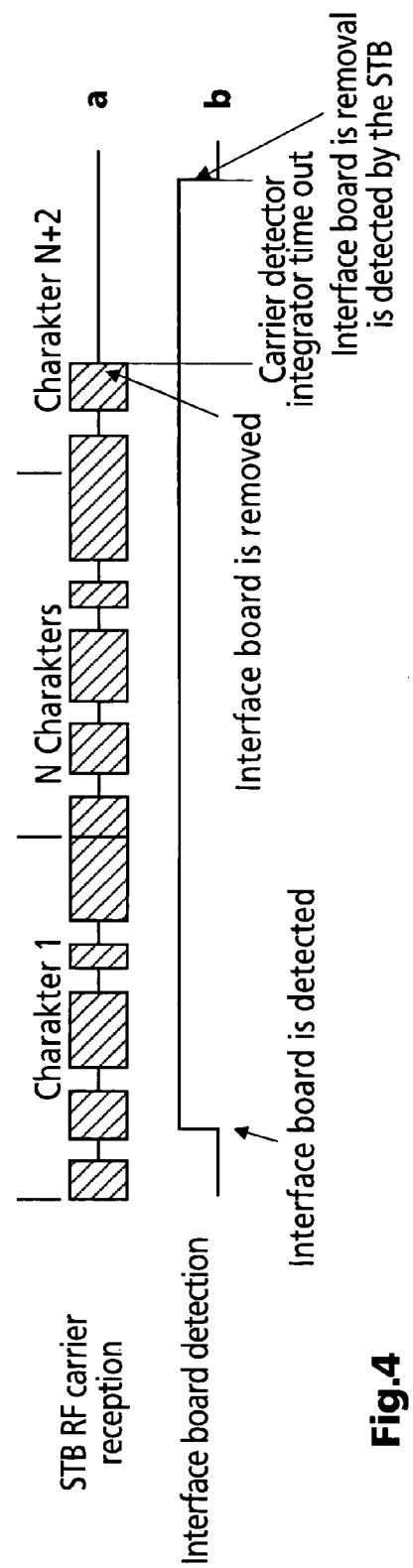

An example for a test sequence for the set-top box 1 is explained with regard to FIG. 4: in FIG. 4a a modulated carrier signal is shown with N+2 characters 1, . . . , N+2 with a sequence of serial data bits providing test information. The carrier signal is modulated as explained with regard to FIG. 3.

In FIG. 4b the response of the set-top box 1 to the carrier signal of FIG. 4a is shown. When the set-top box receives a carrier signal with information characters, the set-top box assumes, that an interface board is connected to the set-top box for a testing of the set-top box. The set-top box 1 then goes into a test mode, in which the set-top box 1 responds to the information data from the control computer 3 and provides respective test results via the audio port 13 to the control computer 3. When the carrier signal is no more present or no more detected, the set-top box 1 assumes after a time out interval that the tests are finished and that the interface board 10 is removed.

The various functions needed within the set-top box for establishing the RS232 link via the audio output ports 13 and 14 can be done at very low cost. Low cost high pass and low pass R/C filters can be used comprising only a resistor and a capacitor. As the detector 21 a diode and a capacitor can be used, and for generating the carrier signal an already available oscillator 25 within the set-top box can be used. The modulator can be arranged also in a simple manner, because only an "on/off" modulation of the carrier frequency is used for the transmission of the information data. The modulation can be performed for example by a simple resistor switch, which switches the carrier signal on and off in response to the data to be transmitted. The power to the interface board 10 can be provided by the set-top box 1 also with only a few low cost elements, as explained above with regard to FIG. 2. As an alternative, the interface board 10 can be powered by an external power supply, as explained with regard to FIG. 1, when the costs of the set-top box have to be kept to a minimum.

The present invention is not limited to the embodiments as shown and described with regard to the figures, and various modifications available come possible for those skilled in the art without departing from the scope of the invention. Data transmission and reception may be arranged also via one audio port only, when using two carrier signals with frequencies, which are sufficiently different for a separation in the set-top box and the interface board. The present invention may be utilized in particular also for digital surround amplifiers, DVD players or DVD recorders, digital television sets and any other digital equipment comprising at least one audio port, in a manner similar as described above for a set-top box.

The invention claimed is:

1. A method for testing an appliance, wherein a first audio port and a second audio port of the appliance are used as an interface for testing the appliance, the method comprising steps of:

powering on the appliance;

providing, via the appliance, a carrier signal to the first audio port of the appliance after the appliance is powered on;

detecting, via the appliance, if the carrier signal is looped back to the second audio port of the appliance;

if no carrier signal is detected, turning off the carrier signal and switching the appliance to a normal operating mode; and if the carrier signal is detected, operating the appliance in a test mode with a control computer.

2. The method according to claim 1, further comprising a step of receiving, via the appliance, digital signals for testing, wherein the digital signals are modulated onto a signal having a frequency above 20 kHz.

3. The method according to claim 1, wherein the first and second audio ports are stereo output ports of the appliance.

4. The method according to claim 2, wherein the appliance generates response signals to the digital signals, and the response signals are modulated by the appliance using an on/off switching mode.

5. The method according to claim 1, further comprising a step of using a test adapter for testing the appliance, wherein the test adapter comprises:

a first port for connecting to one of the first and second audio ports of the appliance;

a second port for connecting to the control computer; and an oscillator for modulating digital signals from the control computer onto a carrier frequency above 20 kHz.

6. The method according to claim 1, wherein if the carrier signal is looped back to the second audio port, the appliance bypasses a DC blocking capacitor for providing a supply voltage to a test adapter, wherein the supply voltage is used by the test adapter for opening a loop between first and second ports of the test adapter.

7. An appliance, comprising:

a first audio output port adapted to output a first analog audio output signal, and to receive a digital test signal from an external computer for testing the appliance;

a second audio output port adapted to output a second analog audio output signal, and to output a response signal to the digital test signal;

a first circuit associated with the first audio output port for separating the digital test signal from the first analog audio output signal; and a second circuit associated with the second audio output port for combining the response signal with the second analog audio output signal.

8. The appliance according to claim 7, further comprising a detector operative to detect a test adapter coupled to the first and second audio output ports.

9. The appliance according to claim 8, wherein the detector is operative to detect the test adapter in response to the appliance being powered on.

10. The appliance according to claim 7, wherein the first and second analog audio output signals are stereo output signals.

11. The appliance according to claim 7, wherein one of the first and second audio output ports is used for powering circuits of a test adapter coupled to the appliance.

* * * * *